United States Patent
Mouch

(10) Patent No.: US 7,789,070 B2
(45) Date of Patent: Sep. 7, 2010

(54) IN-LINE ELECTRO-MECHANICAL MODULATING DEVICE TO MODULATE FUEL FLOW IN FUEL RAILS TO REDUCE NOISE

(75) Inventor: Timothy Alan Mouch, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 12/056,821

(22) Filed: Mar. 27, 2008

(65) Prior Publication Data

US 2009/0241901 A1 Oct. 1, 2009

(51) Int. Cl.
*F02M 63/00* (2006.01)
*F02M 63/06* (2006.01)

(52) U.S. Cl. .................... 123/447; 123/456

(58) Field of Classification Search .............. 123/447, 123/456, 467, 446; 138/26, 28, 30, 37, 108, 138/112
See application file for complete search history.

(56) References Cited

U.S. PATENT DOCUMENTS

| | | | |
|---|---|---|---|
| 3,970,065 A | 7/1976 | Kaibara et al. | |
| 4,651,781 A * | 3/1987 | Kandelman | 138/30 |
| 5,582,003 A | 12/1996 | Patil et al. | |
| 5,709,248 A * | 1/1998 | Goloff | 138/30 |
| 6,178,940 B1 | 1/2001 | Gossling et al. | |
| 6,234,128 B1 * | 5/2001 | Reuss | 123/179.17 |
| 6,848,477 B2 * | 2/2005 | Treusch et al. | 138/44 |
| 6,947,830 B1 | 9/2005 | Froloff et al. | |
| 7,077,108 B2 * | 7/2006 | Fujita et al. | 123/446 |
| 7,240,667 B2 | 7/2007 | Dolker et al. | |
| 7,270,113 B2 | 9/2007 | Hervault et al. | |
| 7,278,396 B2 | 10/2007 | Leone et al. | |
| 7,278,593 B2 | 10/2007 | Wang et al. | |
| 2007/0095545 A1 | 5/2007 | Lembcke et al. | |

OTHER PUBLICATIONS

"Active Exhaust Noise Silencer Technology," TechnoFirst America, http://www.technofirstamerica.com/technologies/exhaust.html, North Alpine, UT, Copyright 2007, Accessed Apr. 14, 2008.

* cited by examiner

*Primary Examiner*—Mahmoud Gimie
(74) *Attorney, Agent, or Firm*—Allan J. Lippa; Alleman Hall McCoy Russell & Tuttle LLP

(57) ABSTRACT

Systems and methods for a direct injection fuel system of an engine to mitigate engine noise are provided. An example includes a modulating device located in the fuel delivery system, where the device is modulated responsive to operation of direct injection fuel injectors in order to reduce noise generated by the injectors.

17 Claims, 4 Drawing Sheets

IN-LINE ELECTRO-MECHANICAL MODULATING DEVICE TO MODULATE FUEL FLOW IN FUEL RAILS TO REDUCE NOISE

BACKGROUND AND SUMMARY

Certain engines, such as Gasoline Turbocharged Direct injection (GTDI) engines, utilize high pressure fuel delivery. In such engines, firing of fuel injectors may generate fuel pressure pulsations, causing a hammering sound or "tick" noise that may be an audible disturbance to drivers, in particular at idle condition. In particular, the noise may be generated by fluidic hammering caused by the opening and closing of the injector in concert with the fuel pump pressure pulsations.

The applicant recognizes that the hammering sound may be at least partially mitigated by providing a mitigating fuel pressure pulse in the fuel rail that is substantially equal in frequency and amplitude, but opposite in polarity or phase to the fuel pressure pulse generated by firing of fuel injectors.

As such, systems and methods for modulating fuel flow of a fuel delivery system including direct injection fuel injectors of an engine to mitigate engine noise are provided. An example of such systems may include a modulating device located in the fuel delivery system upstream of the direct injection fuel injectors, the modulating device configured to generate mitigating fuel pressure pulse(s) for attenuating fuel pressure pulse(s) generated by actuation of the direct injection fuel injectors. An example of such methods may include adjusting the modulating device responsive to actuation of the direct injection injectors, wherein operation of the modulating device is varied responsive to variation of direct injection fuel injector actuation.

In such ways, engine noise caused by firing of fuel injectors in high pressure fuel delivery systems may be reduced or eliminated, making driving a more pleasant experience for drivers, even when using high pressure direct fuel injection. Specifically, in one example, pressure pulses can be generated that substantially cancel those pulses caused by the fuel injection.

DETAILED DESCRIPTION

Figure 1:
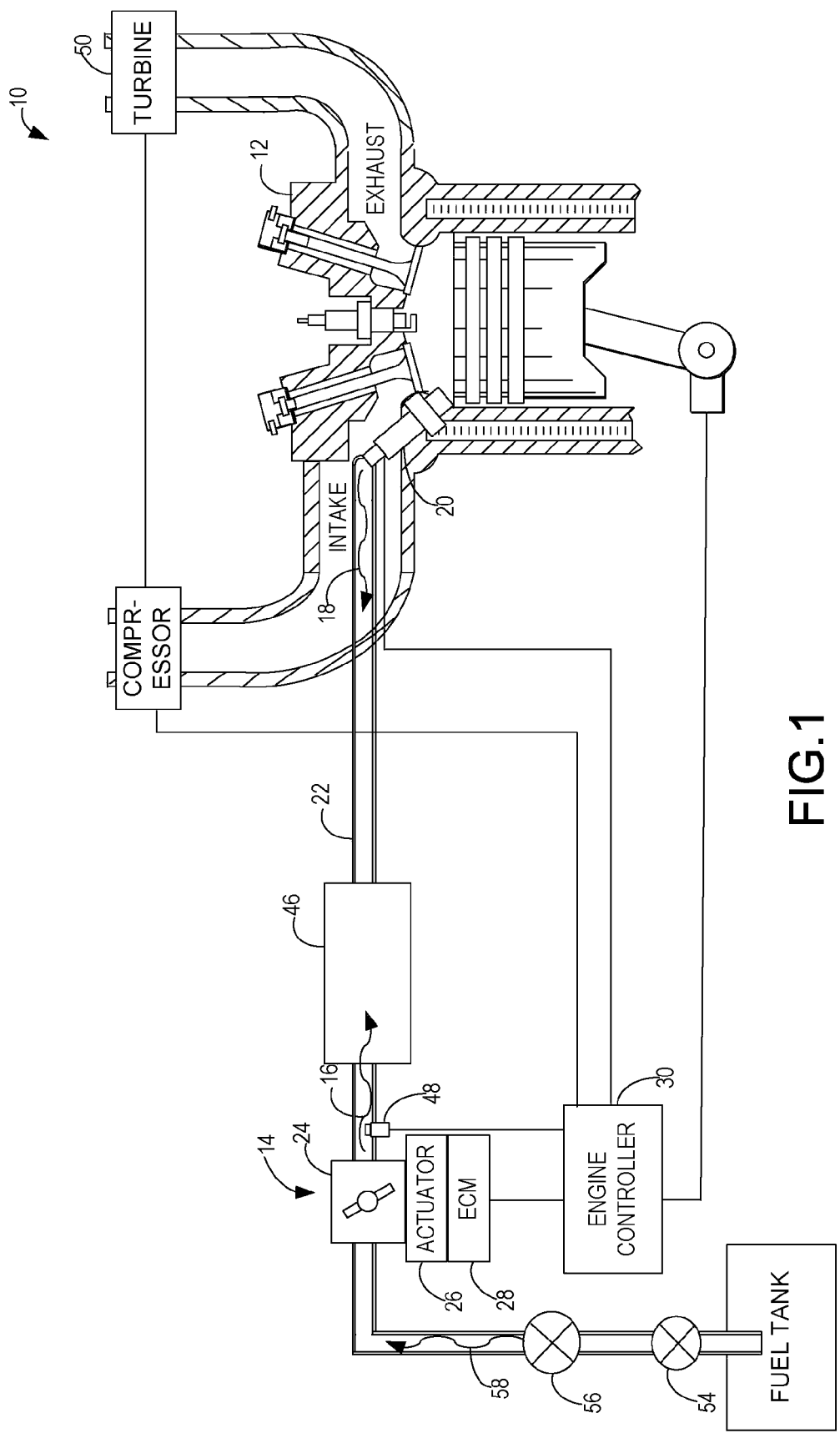
FIG. 1 is a schematic diagram illustrating a system for modulating fuel flow of a fuel delivery system including direct injection injectors of an engine in order to reduce injection noise of the engine.

FIG. 1 illustrates a system 10 for modulating fuel flow of a fuel delivery system including direct injection fuel injectors 20 of an engine 12, in order to reduce noise of the engine. The system 10 may include a modulating device 14 located in the fuel delivery system upstream of the direct injection fuel injectors, where the modulating device 14 is configured to generate mitigating fuel pressure pulse(s) 16 for attenuating fuel pressure pulses 18 generated by actuation of the direction injection fuel injectors 20. The modulating device 14 may be configured to modulate at a selected, and adjustable, frequency, in one example.

The generated mitigating fuel pressure pulse(s) 16 may have substantially the same frequency and amplitude, but substantially different polarity or phase, as the fuel pressure pulses 18, so that when the mitigating fuel pressure pulse(s) 16 encounters the fuel pressure pulses 18, the mitigating fuel pressure pulse(s) 16 may attenuate or cancel the fuel pressure pulses 18, thus reducing engine noise caused by the fuel pressure pulses 18.

The modulating device 14 may be an electromechanical device positioned in-line along a fuel rail 22 of a fuel delivery system of the engine 12, such as upstream of the direct injection fuel injectors 20. The modulating device 14 may be a single self-contained unit, or include several separate units. The modulating device 14 may include at least a movable part 24, an actuator 26 for driving the movable part 24, and an electronic control unit (ECM) 28 for generating a control signal for controlling, through the actuator 26, the oscillating frequency, phase, and/or amplitude of the movable part 24. The ECM 28 may be coupled to an engine controller 30, or integrated into engine controller 30.

The system may further include a control system 11, which may include the ECM 28 and/or the engine controller 30, for controlling operation of the modulating device 14, such as adjusting the selected frequency, selected amplitude, and/or selected phase at which the modulating device 14 is modulated, responsive to engine operating condition(s). In examples where the modulating device 14 includes a flapper valve, the control system 11 may be configured to adjust a selected frequency at which the flapper valve is oscillating.

For example, the control system 11 may adjust the selected frequency at which the modulating device 14 is modulated responsive to engine operating condition(s), such as responsive to variation of fuel injection parameters, such as responsive to fuel injection actuation frequency, where a phase and amplitude of the selected frequency is adjusted to cancel fuel pressure pulses or waves generated by the fuel injection actuation.

For example, the control system 11 may adjust the selected frequency based on engine speed, and/or number of activated (or deactivated) engine cylinders, where the cylinder activation or deactivation refer to fuel injectors are activated (or deactivated), number of fuel injections per engine revolution cycle, since they may affect the frequency of fuel injector actuation, thus the frequency of the fuel pressure pulse(s) 18. For example, the faster the engine speed, the faster the fuel injection actuation will be, thus the higher the frequency of the fuel pressure pulse(s) 18 will be generated. Similarly, the selected frequency may be reduced as engine cylinders are deactivated.

The control system 11 may adjust the selected amplitude at which the modulating device 14, such as the flapper valve 32, is modulated based on various engine operating parameters that affect the amplitude of the fuel pressure pulse(s) 18 generated, such as engine torque, load, and/or vehicle speed, etc.

In some examples, the engine may further include a turbocharger 50. In such cases, the control system 11 may adjust the selected amplitude at which the modulating device 14 is modulated responsive to operation of the turbocharger 50, since the operation of the turbocharger 50 may affect the amplitude of the fuel pressure pulse(s) 18 generated. For example, at higher boost levels, larger fuel injections may be used, resulting in higher pressure pulsation amplitudes.

Additionally, the control system 11 may adjust the operation of the modulating device 14, such as the selected frequency, amplitude, and/or phase at which the modulating device 14 is modulated, based on signal inputs of various engine sensors, such as feedback from the fuel rail pressure sensor(s) 48. In particular, the system may utilize information from the fuel pressure sensor(s) 48 that is related to fuel pressure pulse(s) frequency, amplitude, and/or phase.

Further, the control system 11 may be configured to turn on or turn off the modulating device 14 based on various engine operating conditions and sensor inputs. For example, under certain high load conditions, the noise or tick sound generated by the fuel pressure pulse(s) may not be audible over other engine noise. Further, operating the flapper valve 32 may restrict fuel flow, so that it may be advantageous not to operate the flapper valve 32 under such conditions, with little impact on perceived noise. Thus, under such conditions, the control system 11 may turn off the flapper valve 32.

When the modulating device 14 is turned on or off, or otherwise adjusted, there may be a transition for engaging, disengaging or transitioning the modulating device 14. In such cases, the control system 11 may be configured to account for such transition time in adjusting for the selected frequency, amplitude, and/or phase of the mitigating fuel pressure pulse(s) 16. The control system 11 may be configured to gradually phase in the engagement and/or disengagement of modulating device 14, so that the amplitude of the mitigating fuel pressure pulse(s) 16 may be gradually phased in, rather than all at the once.

In some examples, the fuel delivery system may additionally include various fuel pumps, such as a low pressure fuel pump 54 and a high pressure fuel pump 56. Pump strokes of the various fuel pumps, in particular the high pressure fuel pump 56, may separate fuel pressure pulse(s) 58 in addition to the fuel pressure pulse(s) 18, which may also contribute to the engine ticking sound. In such instances, the control system 11 may be configured to modulate the modulating device 14, such as adjusting the selected frequency, amplitude, and phase at which the modulating device 14 is modulated, responsive to the strokes of various fuel pumps, such as the strokes of the high pressure fuel pump 56.

Figure 2:
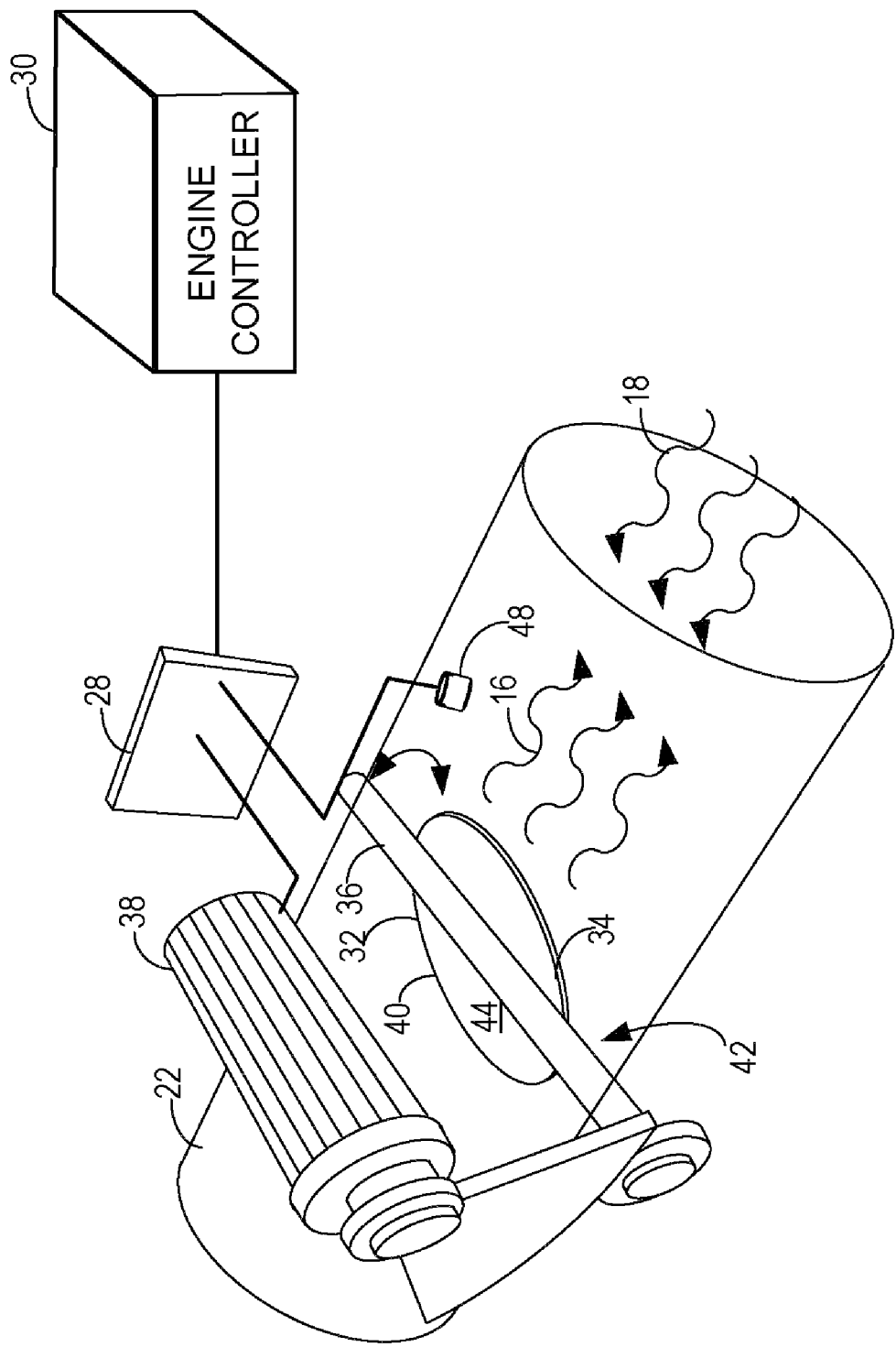
FIG. 2 is a schematic diagram illustrating an embodiment of the modulating device of FIG. 1.

FIG. 2 illustrates a non-limiting example of the modulating device 14. The modulating device 14 is shown to include a flapper valve 32 as the movable part 24, and a motor 38 as the actuator 26 coupled to and driving the flapper valve 32. The motor 38 is shown coupled to an ECM 28, which is in turn coupled to an engine controller 30.

The flapper valve 32 is shown to include a planar flap member 34 mounted on a rotable axis 36, which may be a diametral axis. The rotable axis 36 is shown coupled to the motor 38, which may be a low inertia flat DC motor. The planar flap member 34 may oscillate about the rotable axis 36 to generate the mitigating fuel pressure pulses 16. The frequency of the mitigating fuel pressure pulse(s) 16 may be dynamically controllable in terms of frequency, amplitude, and polarity or phase by varying frequency, amplitude and phase of the oscillation of the planar flap member 34. The oscillation of the planar flap member 36 may be controlled by the ECM 28 or by the engine controller 30 via the ECM 28.

The planar flap member 34 may have an outer perimeter 40. The outer perimeter 40 may define a gap 42 between the fuel rail 22 and the planar flap member 34, so that when the planar flap member 34 has its surface 44 perpendicular to a longitudinal axis (L) of the fuel rail 22, flow of fuel in the fuel rail 22 is not completely blocked. Although FIG. 2 shows that the planar flap member 34 is circular in shape, it needs not to be so in other examples. Various other shapes, such as square, rectangle, and triangle, may also be possible.

The system 10 may additionally include an expansion chamber or decompression chamber 46. The decompression chamber 46 may be positioned along the fuel rail 22 in a location between the fuel injector(s) 20 and the modulating device 14. The decompression chamber 46 may further attenuate the fuel pressure pulse(s) and/or the mitigating fuel pressure pulse(s) and/or any residual fuel pressure pulse(s) by providing a confined space for fuel pressure pulse(s) to bounce back and forth and cancel itself.

The system 10 may further include a pressure sensor 48 that is capable of generating a signal indicating fuel pressure pulse(s) of the fuel delivery system, such as in the fuel rail 22. The pressure sensor 48 may be positioned between the fuel injector(s) 20 and the modulating device 14, in one particular example between the decompression chamber 46 and the modulating device 14. The pressure sensor 48 may transmit the signal to an engine controller 30 and the engine controller 30 may feedback control, via the ECM 28 and the motor 38, the oscillation of the modulating device 14 based on the signal detected by the pressure sensor 48. For example, the controller may modulate its control command to the modulating device 14 to modulate the oscillation frequency, amplitude, and/or phase of the modulating device 14.

Figure 3:
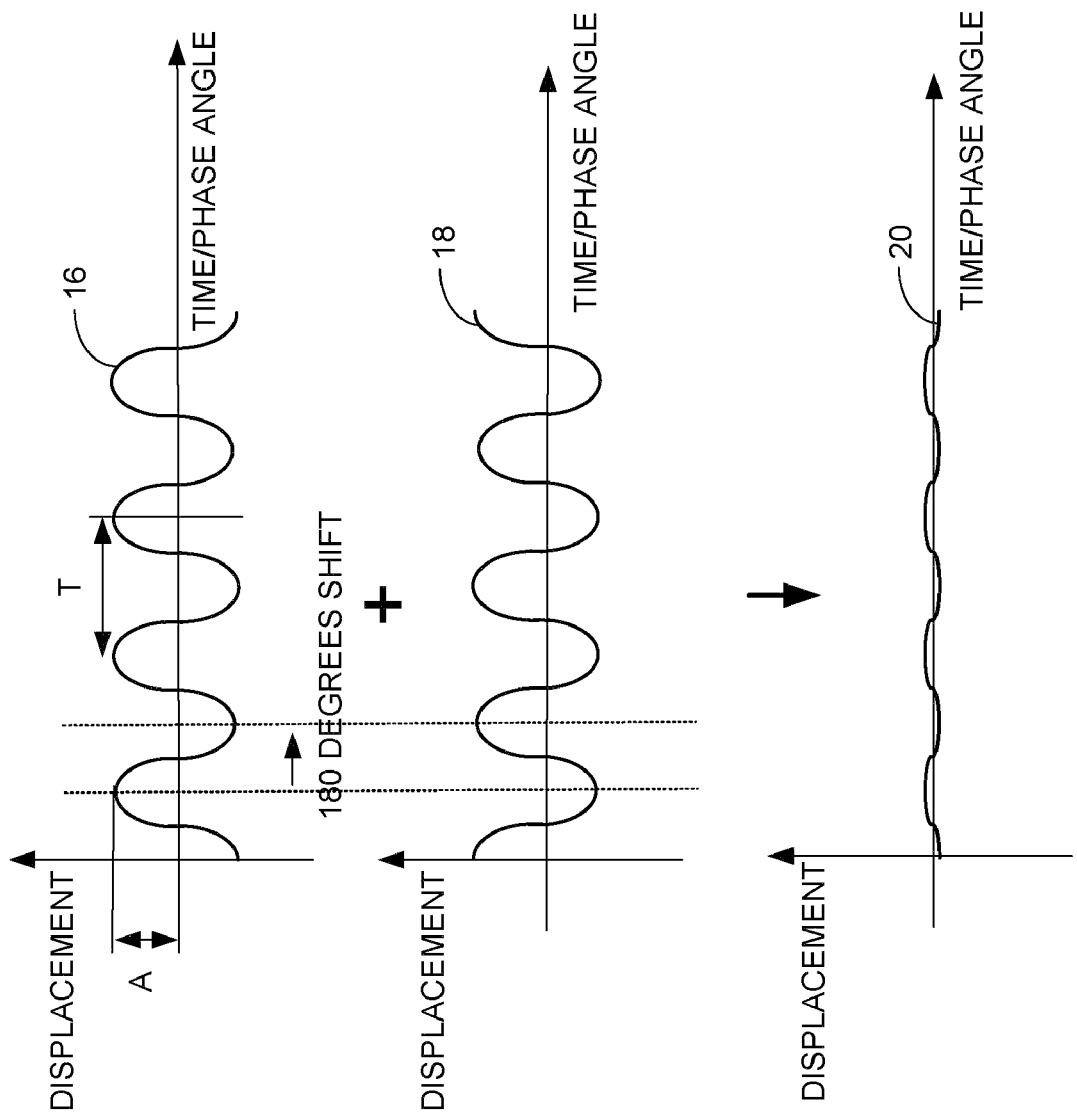
FIG. 3 is a graph illustrating attenuation of fuel pressure pulses generated by firing of engine injectors with mitigating fuel pressure pulses generated by the modulating device of system of FIG. 1.

FIG. 3 shows graphs illustrating a mitigating fuel pressure pulse 16 generated by the modulating device 14 having the substantially the same frequency, amplitude, but different polarity or phase as the fuel pressure pulses 18 generated by firing of injectors. The fuel pressure pulse 18 and the mitigating fuel pressure pulse 16 are attenuated to arrive at an attenuated fuel pressure pulse 20.

The frequency, f refers to a number of pressure pulse cycles for a given period of time. The frequency, f, is inversely related to period, T, which is the time for a single wave of a fuel pressure pulse by the following equation:

$$f = \frac{1}{T}$$

Amplitude, A, refers the maximum strength or height of the fuel pressure pulse oscillation. Phase, θ, refers to the fraction of a complete cycle of a fuel pressure pulse oscillation. As shown in FIG. 3, the fuel pressure pulse 18 is out of phase with the mitigating fuel pressure pulse 16, and the phase angle, θ, between the two is 180 degrees. This is just one example, and varying degrees of amplitude cancellation may be used, along with varying phase differences.

Figure 4:
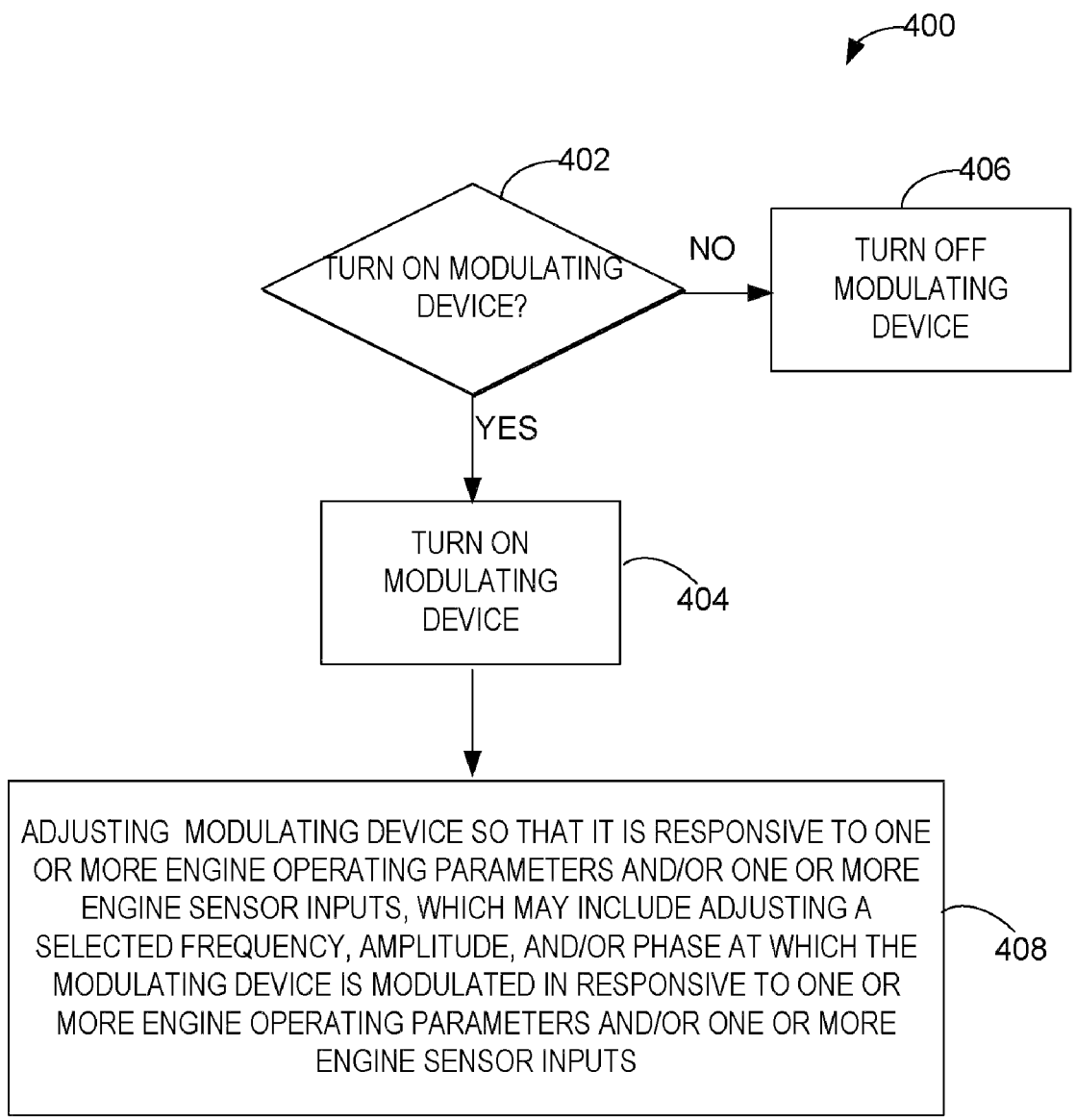
FIG. 4 is a flow chart illustrating a method for mitigating engine noise caused by actuation of direction injection injectors coupled to a high pressure fuel delivery system of an engine.

FIG. 4 is a flow chart illustrating a method 400 for mitigating engine noise caused by actuation of direction injection injectors coupled to a high pressure fuel delivery system of an engine. The method 400 may be implemented in the system 10 including a modulating device 14 as illustrated in FIG. 1. The method may include:

At 402, determining whether to turn on or off the modulating device.

The determination may be based on one or more engine operating parameters. For example, under certain high load conditions, the noise or tick sound generated by the fuel pressure pulse(s) may not be audible over other engine noise and operating the flapper valve may restrict fuel flow, so that it may be disadvantageous to operate the flapper valve under such conditions. Thus, under such conditions, the control system may turn off the flapper valve operation. The method may proceed to 404 if the answer is yes. If the answer is no, the method may proceed to 406.

At 404, the method may include turning on the modulating device. Alternative, at 406, the method may include turning off the modulating device if the modulating device is not turned off already.

At 408, adjusting the modulating device so that it is responsive to one or more engine operating parameters and/or one or more engine sensor inputs, which may include adjusting a selected frequency, amplitude, and/or phase at which the modulating device is modulated in responsive to one or more engine operating parameters and/or one or more engine sensor inputs. In examples where the modulating device includes a flapper valve, the adjusting the modulating device may include adjusting a selected frequency, amplitude, and/or phase at which the flapper valve is oscillating.

As noted herein, various adjustments to the modulating device may be made to provide improved operation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will also be appreciated that the configurations disclosed herein are exemplary in nature, and that these specific embodiments are not to be considered in a limiting sense, because numerous variations are possible. Thus, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for mitigating engine noise caused by actuation of direct injection fuel injectors coupled in an engine high pressure fuel delivery system including a modulating device, comprising:
adjusting the modulating device responsive to actuation of the direct injection fuel injectors, where operation of the modulating device is varied responsive to variation of direct injection fuel injector actuation, and adjusting the modulating device includes adjusting frequency of the modulating device responsive to cylinder fuel deactivation.

2. The method of claim 1, wherein adjusting the modulating device includes adjusting phase of the modulating device responsive to an engine operating condition.

3. The method of claim 1, wherein adjusting the modulating device includes adjusting amplitude of the modulating device responsive to an engine operating condition.

4. The method of claim 1, wherein adjusting the modulating device includes adjusting frequency of the modulating device responsive to an engine operating condition.

5. The method of claim 1, wherein the modulating device is a flapper valve.

6. The method of claim 1, wherein adjusting the modulating device is allowed only when the engine is not in a high load operating condition.

7. A method for mitigating engine noise caused by actuation of direct injection fuel injectors coupled in an engine high pressure fuel delivery system including a modulating device, comprising:
adjusting the modulating device responsive to actuation of the direct injection fuel injectors, wherein operation of the modulating device is varied responsive to variation of direct injection fuel injector actuation, wherein adjusting the modulating device is performed by adjusting oscillation of an in-line electro-mechanical device positioned in a fuel rail of the high pressure fuel delivery system and upstream of the direct injection injectors.

8. The method of claim 7, wherein adjusting the modulating device includes adjusting phase of the modulating device responsive to an engine operating condition.

9. The method of claim 7, wherein adjusting the modulating device includes adjusting amplitude of the modulating device responsive to an engine operating condition.

10. The method of claim 7, wherein adjusting the modulating device includes adjusting frequency of the modulating device responsive to an engine operating condition.

11. The method of claim 7, wherein adjusting the modulating device includes adjusting frequency of the modulating device responsive to cylinder fuel deactivation.

12. The method of claim 7, wherein the modulating device is a flapper valve.

13. The method of claim 7, wherein adjusting the modulating device is allowed only when the engine is not in a high load operating condition.

14. A system for modulating fuel flow in a fuel rail of an engine that utilizes high pressure fuel delivery to mitigate engine noise caused by fuel pressure pulses generated by actuation of direct injection fuel injectors, comprising:
an in-line flapper valve positioned in a high pressure fuel rail, the valve configured to oscillate to generate mitigating fuel pressure pulses that are at substantially a same frequency as, but out-of-phase from, the fuel pressure pulses, wherein the in-line flapper valve includes an outer perimeter defining a gap between the in-line flapper valve and an inner diameter of the fuel rail;
a motor coupled to the in-line flapper valve for driving the flapper valve;
a pressure sensor configured to generate a dynamic pressure signal indicating fuel pressure pulses in the fuel rail; and
an electronic engine controller for controlling the oscillation of the in-line flapper valve via the motor based on a control signal generated by the engine controller, where the control signal for controlling the oscillation of the in-line flapper valve is based on an actuation frequency of the injectors and the dynamic pressure signal detected by the pressure sensor.

15. The system of claim 14, further comprising a decompression chamber positioned along the high pressure fuel rail, downstream of the in-line flapper valve and upstream of the direct injection fuel injectors, the decompression chamber configured to further attenuate fuel pressure pulse(s).

16. The system of claim 14, wherein the control signal for controlling the oscillation of the in-line flapper valve is further based on the dynamic pressure signal detected by the pressure sensor.

17. The system of claim 14, wherein the motor is a low inertia flat DC motor.

* * * * *